No. 748,112. PATENTED DEC. 29, 1903.
E. G. SHORTT.
SLACK TAKE-UP MECHANISM.
APPLICATION FILED SEPT. 13, 1899.
NO MODEL. 8 SHEETS—SHEET 1.

Witnesses:

Edward G. Shortt,
Inventor.

No. 748,112. PATENTED DEC. 29, 1903.
E. G. SHORTT.
SLACK TAKE-UP MECHANISM.
APPLICATION FILED SEPT. 13, 1899.
NO MODEL. 8 SHEETS—SHEET 7.

Fig. 8.

Witnesses:
James F. Duhamel.
J. S. Cadel.

Edward G. Shortt, Inventor
by Fred E. Tasker, Att'y.

No. 748,112. PATENTED DEC. 29, 1903.
E. G. SHORTT.
SLACK TAKE-UP MECHANISM.
APPLICATION FILED SEPT. 13, 1899.

NO MODEL. 8 SHEETS—SHEET 8.

Witnesses:
James F. Duhamel.
J. S. Cadel.

Edward G. Shortt, Inventor
by Fred E. Tasker, Atty.

No. 748,112. Patented December 29, 1903.

UNITED STATES PATENT OFFICE.

EDWARD G. SHORTT, OF CARTHAGE, NEW YORK, ASSIGNOR TO THE INTERNATIONAL AIR BRAKE COMPANY, OF JERSEY CITY, NEW JERSEY, A CORPORATION OF NEW JERSEY.

SLACK-TAKE-UP MECHANISM.

SPECIFICATION forming part of Letters Patent No. 748,112, dated December 29, 1903.

Application filed September 13, 1899. Serial No. 730,297. (No model.)

*To all whom it may concern:*

Be it known that I, EDWARD G. SHORTT, a citizen of the United States, residing at Carthage, in the county of Jefferson and State of New York, have invented certain new and useful Improvements in Slack-Take-Up Mechanism, of which the following is a specification.

My present invention bears reference to improved mechanism for taking up or compensating for the slack or relaxation of the parts which occurs to a greater or less extent in all the various kinds of power-transmitting machinery due to various causes.

These improvements while applicable to numerous constructions of machinery and mechanisms are preëminently advantageous in their application to fluid-pressure brake mechanism. Inasmuch, therefore, as the present invention is primarily adaptable for employment with a fluid-pressure railway-brake apparatus I shall in hereinafter portraying an example of its construction and operation describe its use and illustrate its design in connection with one or more forms of fluid-brakes—as, for instance, a common form of air-brake, or, for another example, an equilibrio air-brake mechanism.

So far as concerns the application of these improvements to fluid-brake mechanisms the essential objects, among others that might be mentioned, may be stated as a material saving of the braking fluid or air and its more effective use in consequence over and above that possible with common and well-known forms of brake mechanism, to provide for interchangeability as between two different brake systems, and to provide for the proper application of the braking power whatever under ordinary conditions may be the clearance or wear of the brake-shoes or the looseness or slack of the harness or rigging, while still preserving desired brake-piston travel.

The invention may therefore be said to consist, essentially, in a fluid-actuated take-up or slack-compensating device for power-transmitting mechanism and automatically brought into action thereby, and also in such a device applied to the rigging of an air-brake system and brought into full operation by the first effects of the brake-applying operation and before the completion of such operation, whether for the purpose of taking up slack or looseness or clearance in part or whole or for partially or initially applying the brake mechanism preliminarily to its full or final application, and the invention also comprises numerous details in the construction, arrangement, and combination of parts substantially as will be hereinafter described and claimed.

In the annexed drawings illustrating my invention.

Similar characters of reference designate like parts throughout all the different figures of the drawings.

Figure 1:
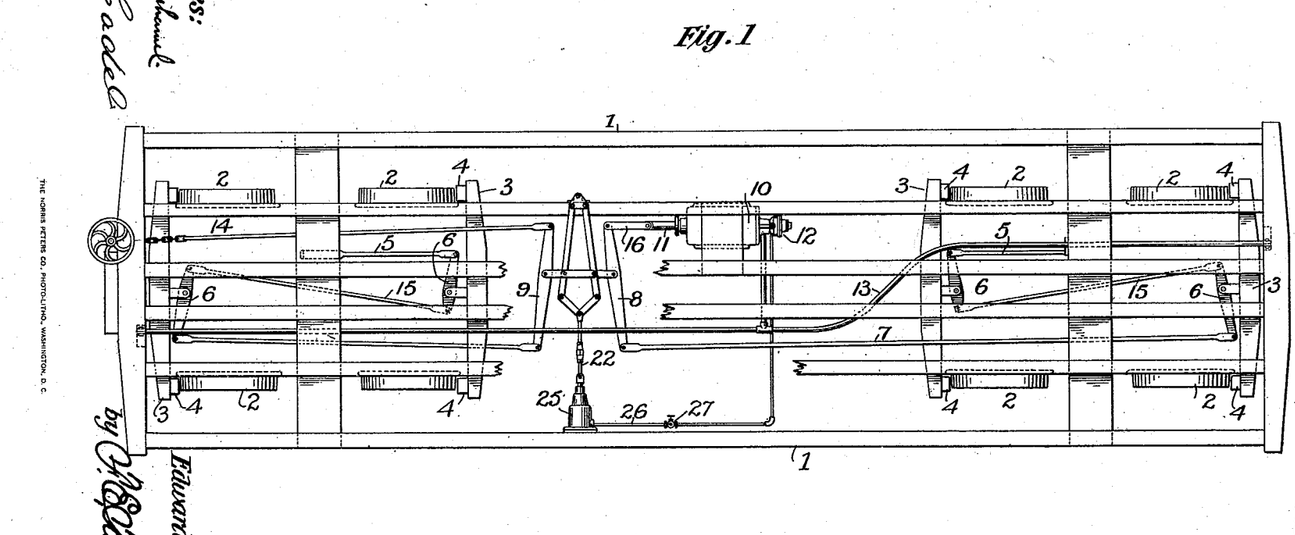
Figure 1 is a bottom plan view of a railway-car having air-brake mechanism applied thereto embodying my present improvements.

Referring more particularly to Fig. 1, 1 denotes the timbers or framework of the floor of a car; 2, the truck-wheels; 3, the brake-beams carrying the brake-shoes 4; 5, the dead-lever fulcrum at each end of the car; 6, the brake-levers pivoted to offsets on the brake-beams 3; 7, the brake-rods; 8 and 9, the floating levers; 10, the brake-cylinder; 11, the brake-piston and its rod or stem; 12, the triple-valve mechanism; 13, the train-pipe; 14, the hand-brake rod; 15, the links connecting the members of each pair of brake-levers. It will be observed that the leverage combination just referred to is given simply as a specimen arrangement and that I am not to be restricted thereto; but the take-up device is susceptible of adaptation to and arrangement with manifold other forms of brake leverage. Furthermore, it will be noted that the brake-cylinder, brake-piston, and rod (as represented in the drawings) are so constructed that the brakes will be set when the piston-rod moves or pulls inwardly instead of when it pushes outwardly, said inward-pulling action being the mode of operation that obtains in an equilibrio air-brake system, an illustration of which is found in my former Letters Patent, No. 538,552, dated April 30, 1895, and being the reverse of the pushing action characteristic of many forms of brake.

Figures 9, 10:
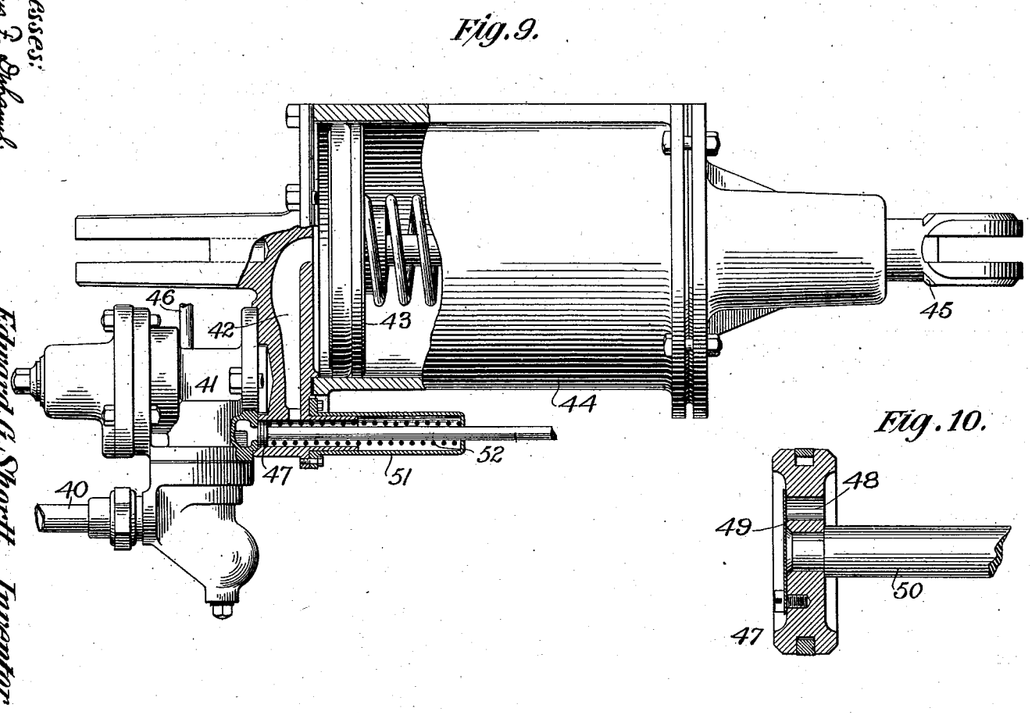
Figs. 9 and 10 illustrate my invention as applied to one form of common brake mechanism.

One form of valve with which my improved take-up device may be employed is fully shown and described in my former Letters Patent on air-brake valve mechanism, No. 685,182, dated October 22, 1901. Another common form of valve is shown in Figs. 9 and 10 and will be hereinafter more fully explained. It must be understood, therefore, that my present improvements are susceptible of being applied operatively to various kinds of air-brake valves.

Figure 2:
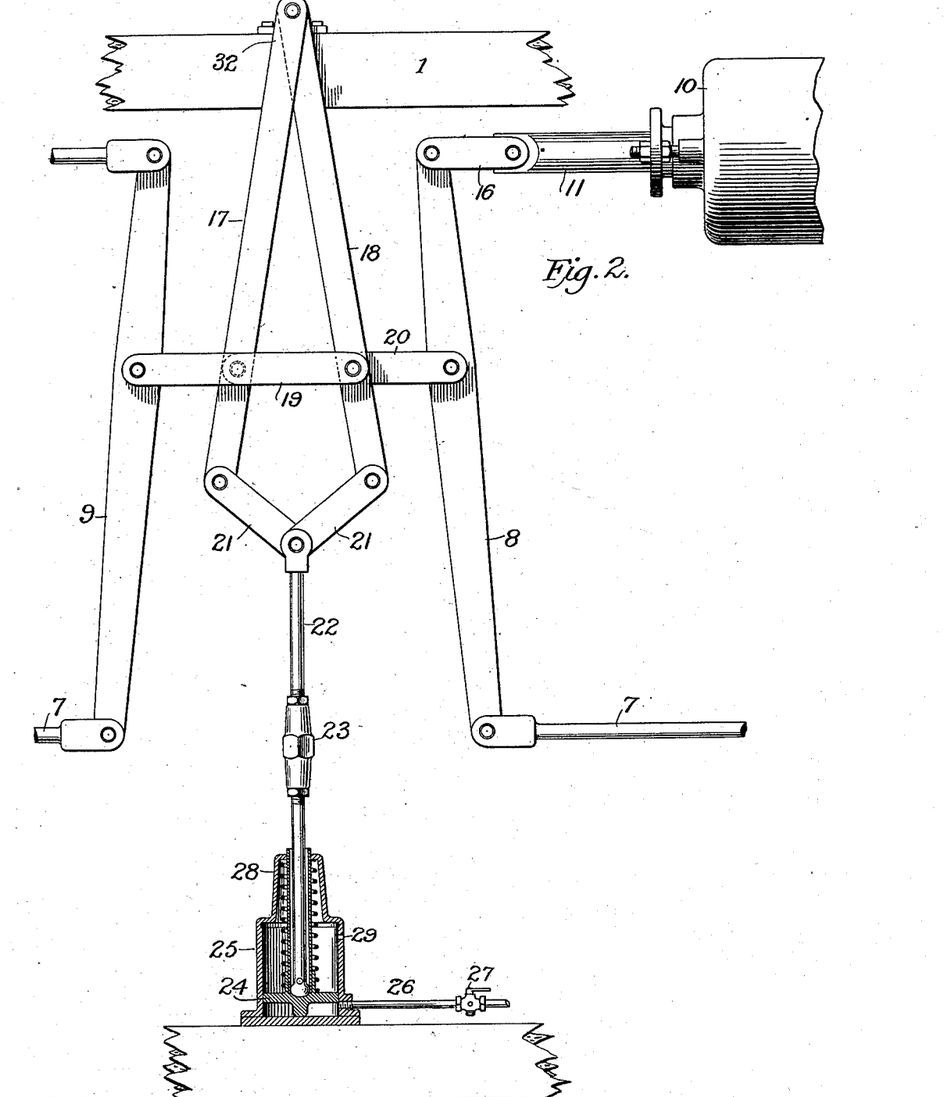
Fig. 2 is an enlarged detail view of my improved take-up mechanism which forms a part of the harness between the brake-cylinder and brake-shoes, the parts being shown in released position.
Figure 3:
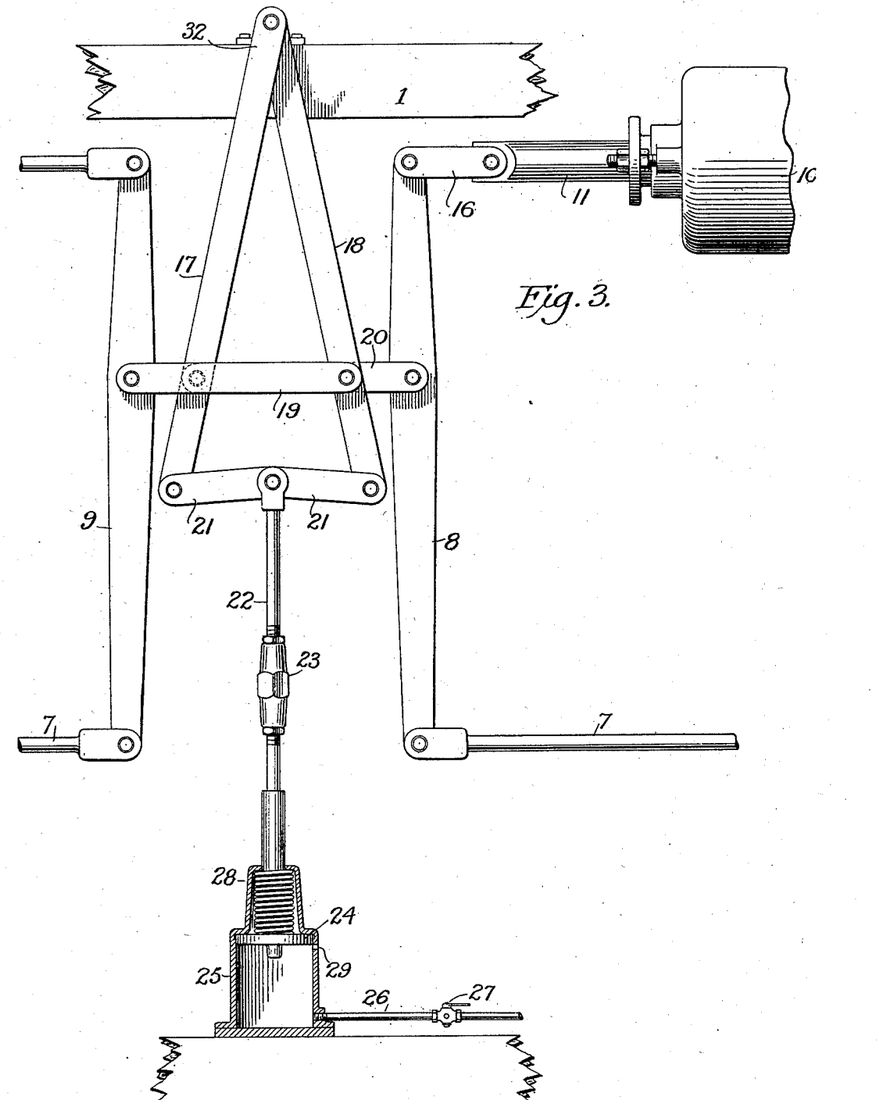
Fig. 3 is a similar view showing the same mechanism in application position.

Referring now to Figs. 2 and 3, I will proceed to describe the take-up devices proper. One of the floating levers, as 8, is pivoted directly at one end to a pull-head or like device 16, which in turn is pivoted to the rod 11 of the brake-piston. 17 and 18 designate "compensating levers" or "expansion-levers," as they may be termed, having common fulcrum ends which are pivoted to the floor-beams 1 of the car at 32, said levers diverging from the pivoted point, so as to lie at an angle to each other, as shown. The lever 8 is connected by link 20 with expansion-lever 17, and the lever 9 is connected by link 19 with expansion-lever 18. The ends of the expansion-levers 17 and 18 opposite to their pivotal point 32 are connected together by means of the interpivoted toggle-links 21 21, the common ends of which are pivotally secured to the piston-rod 22, having an adjusting screw-sleeve 23, by means of which it can be lengthened or shortened, and said rod 22 being attached to a piston 24, reciprocating in the air-cylinder 25, which is connected by a pipe 26 with the triple valve 12, the attachment to the latter being made in such a manner that pressure may be exhausted or transferred into pipe 26 and thereby to the cylinder 25 at such time and in such quantity as may be desired. A three-way cock 27 is provided in pipe 26, whereby said pipe can be put into communication with said cylinder 25 or can be closed against opening therewith and be opened directly to the atmosphere. The piston 24 is equipped with a retracting-spring 28 to return it to running position, as in Fig. 2, and the cylinder 25 has a lateral vent-port 29, whereby air contained in the cylinder can escape into the atmosphere after the toggle-arms of the take-up mechanism have been locked in application position, the piston 24 having reached the end of its stroke and passed and uncovered the port 29.

It will now be manifest that upon the first reduction of train-pipe pressure communication will be established between the triple valve (or some other part) and the take-up cylinder, (in the case of an equilibrio system it would be between the brake-cylinder and the take-up cylinder,) so that the first air that escapes in consequence of the operation of the triple valve will rush into the take-up cylinder and cause its piston to be pushed to take-up or application position, as shown in Fig. 3. This action of the take-up piston will cause the expansion-levers to spread and in separating they will straighten out the rigging and bring the brake-shoes almost into contact with the wheels, so that when the brake-applying pressure (either from the train-pipe or the auxiliary reservoir, or both, as the case may be) is caused to act upon the brake-piston the harness or rigging will be held so as not to have any essential movement, and, if desired, the whole effect of the stored reservoir-air (or other brake-setting pressure) can be applied to the brake-shoes without expanding or being reduced in pressure, and this action of the take-up mechanism will be the same whether a graduation application is made or a full or emergency application.

After a setting of the brakes has been concluded and it is desired to release them the engineer will, as usual, restore train-pipe pressure, whereupon the triple-valve mechanism will be returned to release position and communication between the triple valve or brake-cylinder and the take-up cylinder closed, thus releasing the mechanism, taking off all strain from the brake-harness, and permitting the take-up piston to retreat under the stress of its retracting-spring, whereupon the expansion-levers will be brought toward each other, as shown in Fig. 2, and the brake-shoes drawn away from the wheels.

In the case of the mechanism delineated in Figs. 2 and 3 only a certain amount of take-up can be effected, which within certain limits can be regulated by the screw or elongation sleeve 23, and hence there might be some travel of the brake-piston, which, however, would probably be determinable. If this travel be *nil* or at most very small, then it is manifest that a much higher braking pressure would be attained (represented by practically the full reservoir or other brake-applying power) than is attained by such full pressure when expanded by only the shortest piston travel permitted. The proportions and motions of the take-up mechanism would of course be graduated to correspond to the average loose or slack motion desired.

Figure 4:
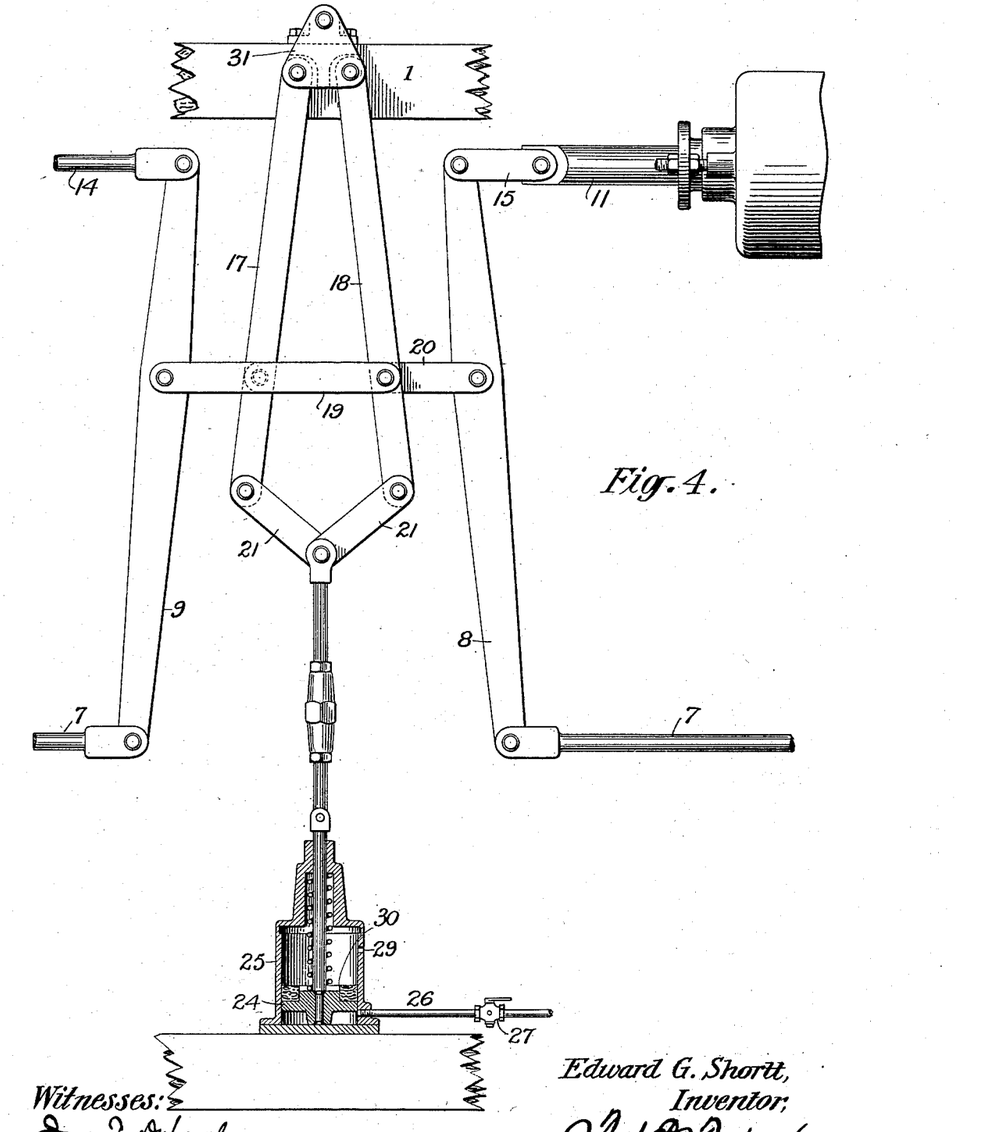
Figs. 4 and 5 illustrate a modified form of my invention.
Figure 5:
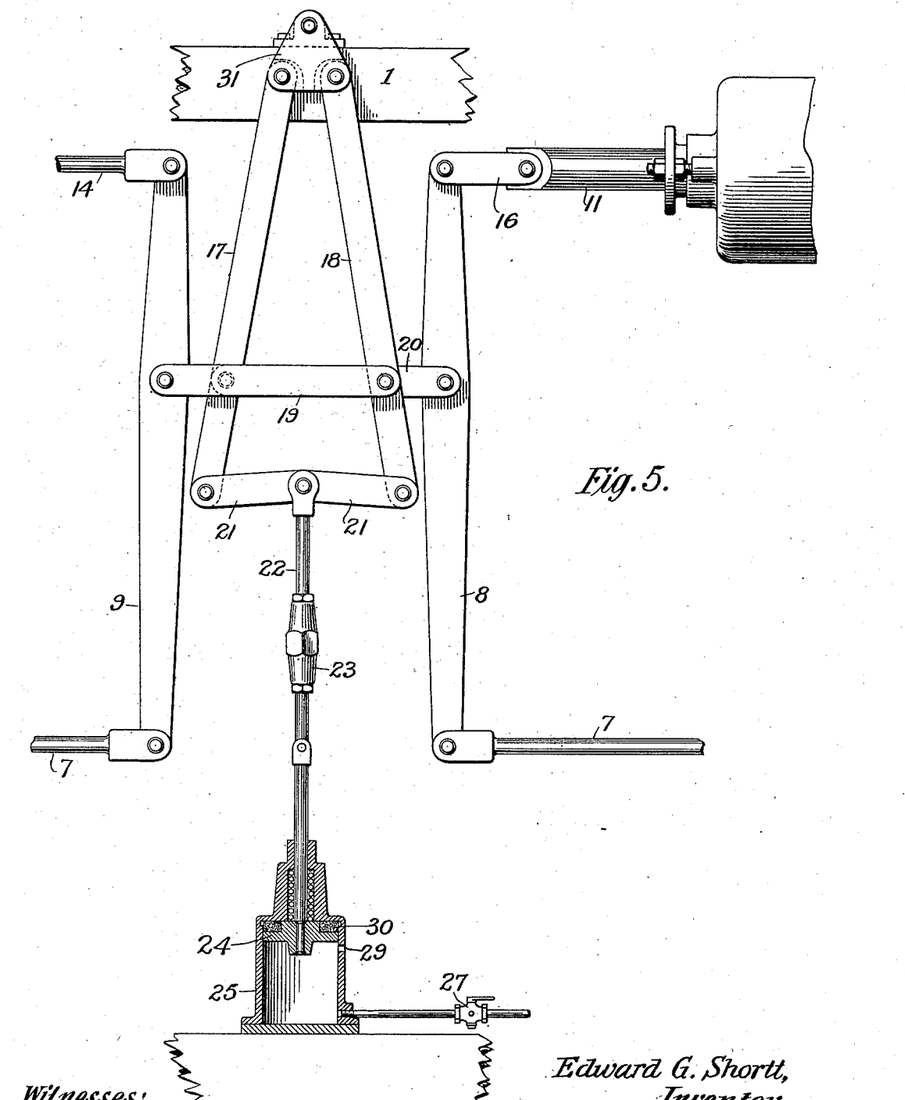

Another means of regulating the piston travel or braking pressure is illustrated in Figs. 4 and 5, where the take-up piston is shown provided with a cushion or spring 30, which after the take-up action has been effected and the toggles 21 carried past their center line, Fig. 5, acts by being compressed under brake-piston strain to let the compensation-levers 17 and 18 approach each other and correspondingly increases brake-piston travel. In these figures also is shown the oscillating pivot-plate 31, which carries the pivoted ends of their compensating levers and is in turn pivoted to a car-timber. By this means I equalize angular strains between these levers and provide for their movement with the brake-piston without injuring or disturbing the action of the take-up piston and its rod.

Thus far I have described mechanism that has for successive applications and without material change of adjustment a definite motion.

Figures 6, 7:
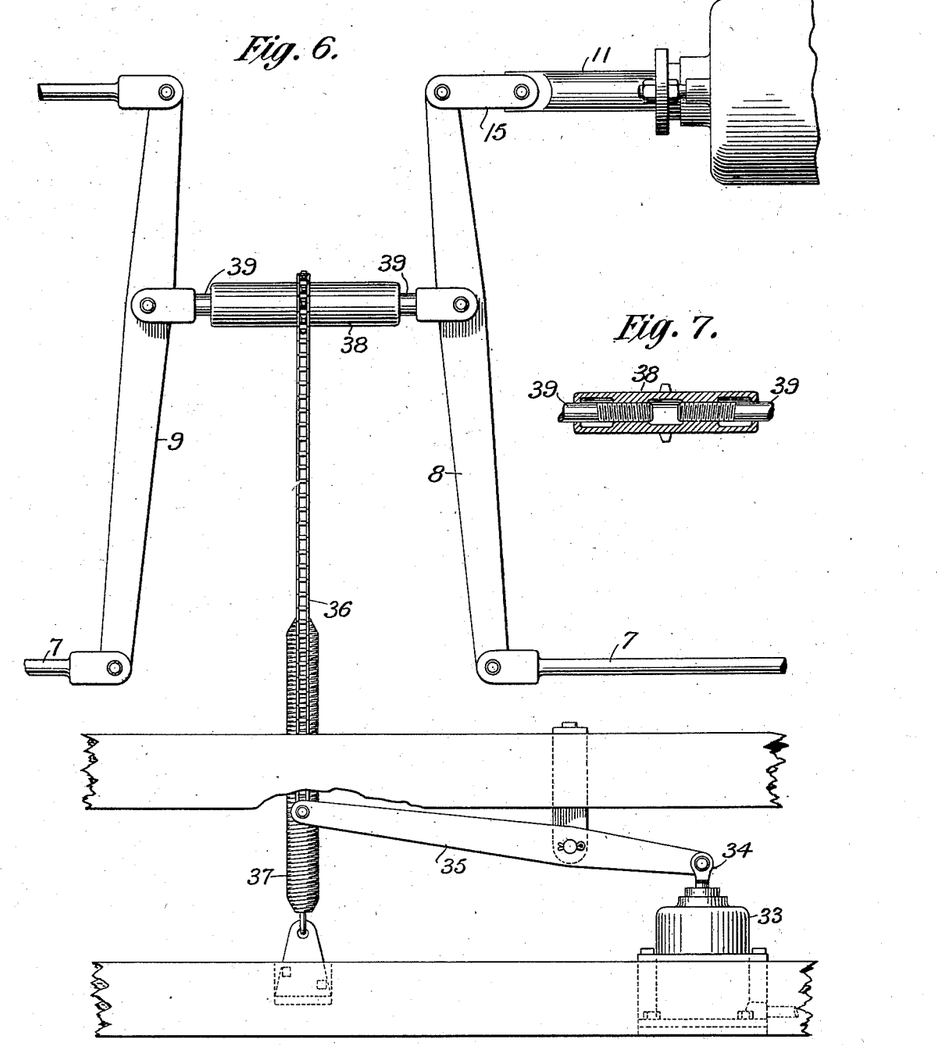
Figs. 6, 7, and 8 represent still another modified form of my invention, Fig. 6 being a plan view, Fig. 7 a detail of certain of the parts, and Fig. 8 a side elevation.
Figure 8:
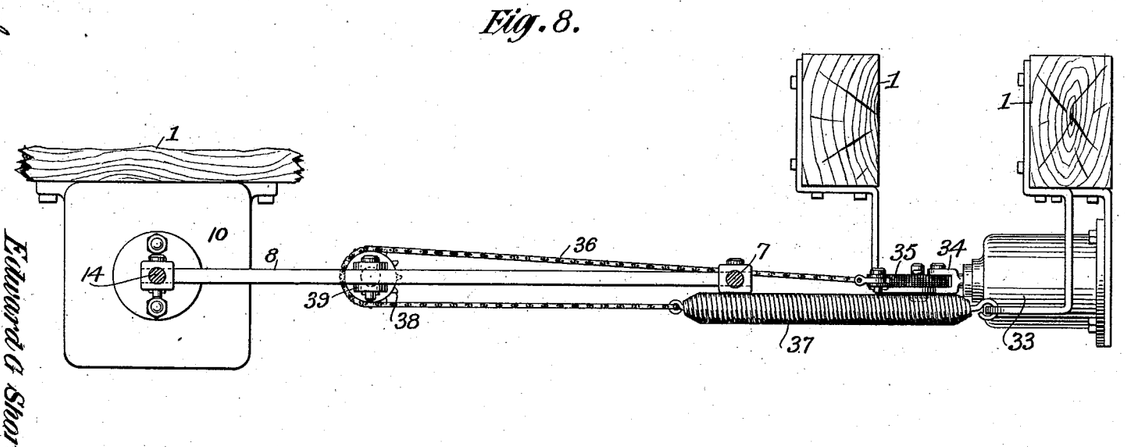

Another convenient form of mechanism that is especially useful in conjunction with a minimum of brake-piston travel, if any, is illustrated in Figs. 6, 7, and 8 and may be employed to good advantage. Here the take-up piston 34 in air-cylinder 33 is connected to one end of the multiplying-lever 35, to the other end of which is attached the sprocket-chain 36, anchored to the car-timbers by spring 37, and passing around the sprocket-screw sleeve 38, engaging by reverse threads the draw-rods 39, pivoted to the compensation-levers 8 and 9.

In Figs. 9 and 10 I show the application of my take-up mechanism to a common brake system—that is, to one in which the triple-valve mechanism directly controls the admission of auxiliary-reservoir air to a brake-cylinder having a spring-retracted piston. 40 represents the train-pipe; 41, the triple-valve mechanism; 42, the passage therefrom to the brake-piston 43 in cylinder 44 and having rod 45, and 46 the reservoir-pipe to the triple valve. In or opening into the passage 42 is located the piston 47, pierced with valve-passage 48, covered on the application or triple-valve side by spring-valve 49. 52 is the piston-rod, and 51 the barrel or cylinder in which it moves. At the time of making application reservoir-air acts against the take-up piston 47 and causes its rod 52 (supposably connected to a suitable form of take-up mechanism forming part of the harness to which piston 43 is operatively attached) to project and take up the harness slack and brake-shoe clearance and preliminarily apply the brake-shoes. This is readily accomplished during the time reservoir-air is expanding into the brake-cylinder (this air is practically at maximum pressure when it acts on the take-up piston) and overcoming its inertia and its frictional resistance, as well as that of its retracting-spring, the connection between rod 52 and the brake-shoe rigging may obviously be made by means of any suitable intervening leverage the parts and details of which need not be set forth here. Rod 52, for example, may act through suitable levers against floating levers 8 and 9 in like manner as rod 22 acts in the form of leverage shown in Figs. 2, 3, 4, and 5. Of course if the brake piston or cylinder have a leakage-groove then the piston should be permitted a movement sufficient to close the same, though even then the piston travel can be reduced much below and cylinder-air maintained at higher pressure than is common and at the same time much more effective braking action had, especially in graduation action.

Various other forms of this mechanism in whole or part are possible, and I do not, therefore, confine myself to those herein set forth, the essential principle of my improvement being as already stated.

Having thus described my invention, what I claim as new, and desire to secure by Letters Patent, is—

1. In combination in an air-brake system, and with the auxiliary reservoir, train-pipe, and valve mechanism thereof, a device acting to take up the slack of the air-brake harness, connections between said mechanism and the exhaust-port of the valve mechanism, whereby under train-pipe reduction of pressure the air exhausted from the system is caused to preliminarily take up the slack of the rigging of the system.

2. In combination in an air-brake system and with the train-pipe, auxiliary reservoir and valve mechanism thereof, means operatable under train-pipe variation of pressure to effect a preliminary application of the brake-shoes, said means being connected with the valve mechanism and means for subsequently applying the braking pressure stored in the auxiliary reservoir of the system.

3. In a fluid-pressure brake, the combination with the harness or rigging carrying the brake-shoes, of means for taking up the slack or looseness of such harness prior to the brake-setting operation, said means including a connection with the valve mechanism.

4. In a fluid-pressure brake mechanism the combination with the harness carrying the brake-shoes, of means for taking up the slack or looseness of such harness, previous to the application of the brakes, said means being actuated by fluid-pressure taken from the brake system through a connection with the valve.

5. In a fluid-pressure brake mechanism, the combination with the harness carrying the brake-shoes, of means for taking up the slack of such harness, consisting essentially of a fluid-actuated piston that receives its impulses from the valve through a connection with the exhaust thereof, and a leverage operated by said piston.

6. The combination with the auxiliary reservoir, brake-cylinder, train-pipe, valve mechanism, and brake-shoe rigging, of a slack-take-up device, consisting essentially of a cylinder containing a piston, a pipe leading from a valve-port to said cylinder, and levers connecting the said piston and the brake-shoe rigging, said levers consisting essentially of compensating levers having toggle-links connected to the piston-rod, and link connections between said compensating levers and the floating levers that connect with the brake-shoe rigging.

7. In a fluid-pressure brake mechanism, the combination with the harness carrying the brake-shoes, of means for taking up the slack of such harness, consisting essentially of a fluid-actuated piston that receives its impulse from the valve through a connection with the exhaust thereof, and a leverage operated by said piston consisting essentially of pivoted compensating levers, and interpivoted toggle-links pivoted to said levers and the piston-rod, and links connecting said compensating levers with the floating levers that connect with the brake-shoe harness.

8. In a fluid-pressure brake mechanism, the combination with the harness carrying the brake-shoes, of means for taking up the slack or looseness of such harness prior to the brake-setting operation, said means consisting essentially of a fluid-actuated piston having a connection with the valve mechanism, and a leverage operated by said piston, consisting essentially of compensating levers having toggle-links actuated by the piston-rod, and means whereby the movement of the compensating levers is transmitted to the brake-shoe harness.

9. In a fluid-pressure brake mechanism, the combination with the harness carrying the brake-shoes, of means for taking up the slack or looseness prior to the brake-setting operation, said means consisting of a piston that receives its impulses from the valve through a connection with the exhaust thereof, said piston having a piston-rod, compensating levers pivoted to the car, toggle-links pivoted to the ends of said levers and to the piston-rod, floating levers that are connected with the brake-shoe harness, and links pivoted to said levers and to the compensating levers.

In testimony whereof I affix my signature in presence of two witnesses.

EDWARD G. SHORTT.

Witnesses:
MILTON CARTER,
E. D. EAMES.